(12) United States Patent
Gibson et al.

(10) Patent No.: US 7,426,915 B2
(45) Date of Patent: Sep. 23, 2008

(54) SYSTEM AND METHOD FOR REDUCING VEHICLE ACCELERATION DURING ENGINE TRANSITIONS

(75) Inventors: Alex Gibson, Ann Arbor, MI (US); John O. Michelini, Sterling Heights, MI (US); James McCallum, Ann Arbor, MI (US); Ilya V. Kolmanovsky, Novi, MI (US); Gang Song, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 11/298,199

(22) Filed: Dec. 8, 2005

(65) Prior Publication Data

US 2007/0131196 A1    Jun. 14, 2007

(51) Int. Cl.
*F02D 17/00* (2006.01)
(52) U.S. Cl. .................. 123/198 F; 477/111
(58) Field of Classification Search .............. 123/198 F, 123/406.23, 406.47, 481; 701/101, 102, 701/111; 417/111
See application file for complete search history.

(56) References Cited

U.S. PATENT DOCUMENTS

| | | | |
|---|---|---|---|
| 4,489,685 A | 12/1984 | Kinoshita et al. | |
| 4,585,101 A * | 4/1986 | Danno | 192/3.31 |
| 5,562,086 A * | 10/1996 | Asada et al. | 123/568.21 |
| 5,597,371 A | 1/1997 | Toukura | |
| 6,431,154 B1 | 8/2002 | Inoue | |
| 6,499,449 B2 * | 12/2002 | Michelini et al. | 123/90.15 |
| 6,561,145 B1 * | 5/2003 | Stockhausen et al. | 123/90.15 |
| 6,647,947 B2 * | 11/2003 | Boyer et al. | 123/198 F |
| 6,754,578 B1 | 6/2004 | Bidner et al. | |
| 7,028,670 B2 * | 4/2006 | Doering | 123/481 |
| 7,069,903 B2 * | 7/2006 | Surnilla et al. | 123/339.19 |
| 7,069,910 B2 * | 7/2006 | Surnilla et al. | 123/481 |
| 7,249,583 B2 * | 7/2007 | Bidner et al. | 123/198 DB |

* cited by examiner

*Primary Examiner*—Stephen K. Cronin
*Assistant Examiner*—Arnold Castro
(74) *Attorney, Agent, or Firm*—Allan J. Lippa; Alleman Hall McCoy Russell & Tuttle, LLP

(57) ABSTRACT

A method for controlling an engine to reduce vehicle shuffle mode vibration during mode transition. The engine includes multiple cylinders, each with at least one electrically actuated valve, and the engine operates in a first mode having a first number of firing cylinders and a second mode having a second number of firing cylinders. The method comprises transitioning the engine from operating in the first mode to the second mode; adjusting at least a valve timing or lift of one of a last cylinder to be fired in said first mode and a first cylinder to be fired in said second mode to temporarily adjust a cylinder torque and thereby reduce vehicle shuffle mode vibration.

9 Claims, 7 Drawing Sheets

SYSTEM AND METHOD FOR REDUCING VEHICLE ACCELERATION DURING ENGINE TRANSITIONS

FIELD

The present application relates generally to the control of variable displacement operation of an internal combustion engine having electromechanical cylinder valves, and more specifically to a system and method to reduce torque output transients during operation mode changes.

BACKGROUND

One method to improve fuel economy and reduce emissions in an engine with electromechanical valves is to operate the engine with a reduced number of firing cylinders per unit time for some operating conditions. By reducing the number of firing cylinders, the engine pumping losses can be reduced. When transitioning between different numbers of firing cylinders, air charge, spark timing, and fuel can be adjusted on a cylinder-by-cylinder basis to deliver the desired engine torque and provide smooth torque output.

However, when the number or firing rate of the firing cylinders is changed, a transient in the individual cylinder engine output torque may be generated, even if the cycle average torque before and after the transition is maintained relatively constant. Such transient operation may excite driveline/vehicle vibration modes, such as a shuffle mode.

One approach to suppress the vibration of the vehicle due to variation of engine output when reactivating cylinders is described in U.S. Pat. No. 5,597,371. In the '371 reference, a timing is detected according to which a vehicle accelerates from a fuel cut state, and a cylinder is detected in which combustion takes place immediately after this timing. A cylinder corresponding to a predetermined combustion order from the detected cylinder is then specified. By reducing the torque produced in the specified cylinder, forward/backward vibration of the vehicle due to variation of engine output torque during acceleration from coasting (no fuel firing) is allegedly suppressed.

However, the inventors have recognized several disadvantages with the above approach. As one example, the inventors herein have recognized that even if torque is reduced as described above, the vibration mode may still be excited depending on engine speed, the number of cylinders deactivated, and other factors. As another example, the inventors have recognized that decreasing engine torque during the transition can exacerbate vibration in some conditions. Finally, the inventors herein have recognized that vehicle vibration may also occur when deactivating engine cylinders or when a torque per cylinder in the first operating mode may be greater than the torque per cylinder in the second operating mode or when the number of the firing cylinders in the first operating mode is less than the number of the firing cylinders in the second operating mode. Again, in these cases, the '371 approach may actually exacerbate vehicle vibration.

SUMMARY

Thus, one approach to overcome the above disadvantages uses a method for controlling an engine having multiple cylinders, each with at least one electrically actuated valve, the engine operating in a first mode having a first number of firing cylinders and a second mode having a second number of firing cylinders, the method comprising:

transitioning the engine from operating in the first mode to the second mode;

adjusting at least a valve timing or lift of one of a last cylinder to be fired in said first mode and a first cylinder to be fired in said second mode to temporarily adjust a cylinder torque and thereby reduce vehicle shuffle mode vibration.

In this way, it is possible to not only maintain a cycle average torque before and after the transition, but also to provide a desired engine torque profile that reduces excitation of selected frequencies, such as the vehicle shuffle mode. For example, torque output in selected cylinders in the second mode may be increased when a number of firing cylinders in the second mode are increased. On the other hand, torque output in selected cylinders in the second mode may be decreased when a number of firing cylinders in the second mode are decreased.

In another approach, a method is provided for controlling an engine of a vehicle traveling on a road, the engine having multiple cylinders with electromechanical valve actuator and an operating mode being changed from a first mode having a first number of firing cylinders to a second mode having a second number of firing cylinders, the method for controlling output torque during a transition from the first mode to the second mode, comprising:

adjusting the output torque of the last cylinder in the first mode;

adjusting the torque output of a preselected cylinder in the second mode to reduce a shuffle mode excitation and longitudinal acceleration of the vehicle.

In this way, it is possible to better reduce vibration excitation at various speeds and numbers of firing cylinders.

In still another approach, a method is provided for controlling an engine having multiple cylinders, each with at least one electrically actuated valve, the engine operating in a first mode having a first number of firing cylinders and a second mode having a second number of firing cylinders greater than said first mode, the method comprising:

when transitioning the engine from operating in the first mode to the second mode and maintaining average torque substantially constant; operating a last cylinder in said first mode provides a reduced torque output relative to the average torque output; operating a first cylinder in said second mode to be a firing cylinder with an increased torque relative to the average torque output; and When transitioning the engine from operating in the second mode to the first mode and maintaining average torque substantially constant; operating a last cylinder in said second mode to be a firing cylinder; operating a first cylinder in said first mode to be a firing cylinder, where a torque output of said first cylinder in said first mode is reduced relative to the average torque output.

In this way, it is possible to reduce vibration when a number of the firing cylinders in the next mode are either increased or decreased. Specifically, under some conditions, increasing (rather than decreasing) cylinder torque can reduce vibration.

DETAILED DESCRIPTION

Figure 1:
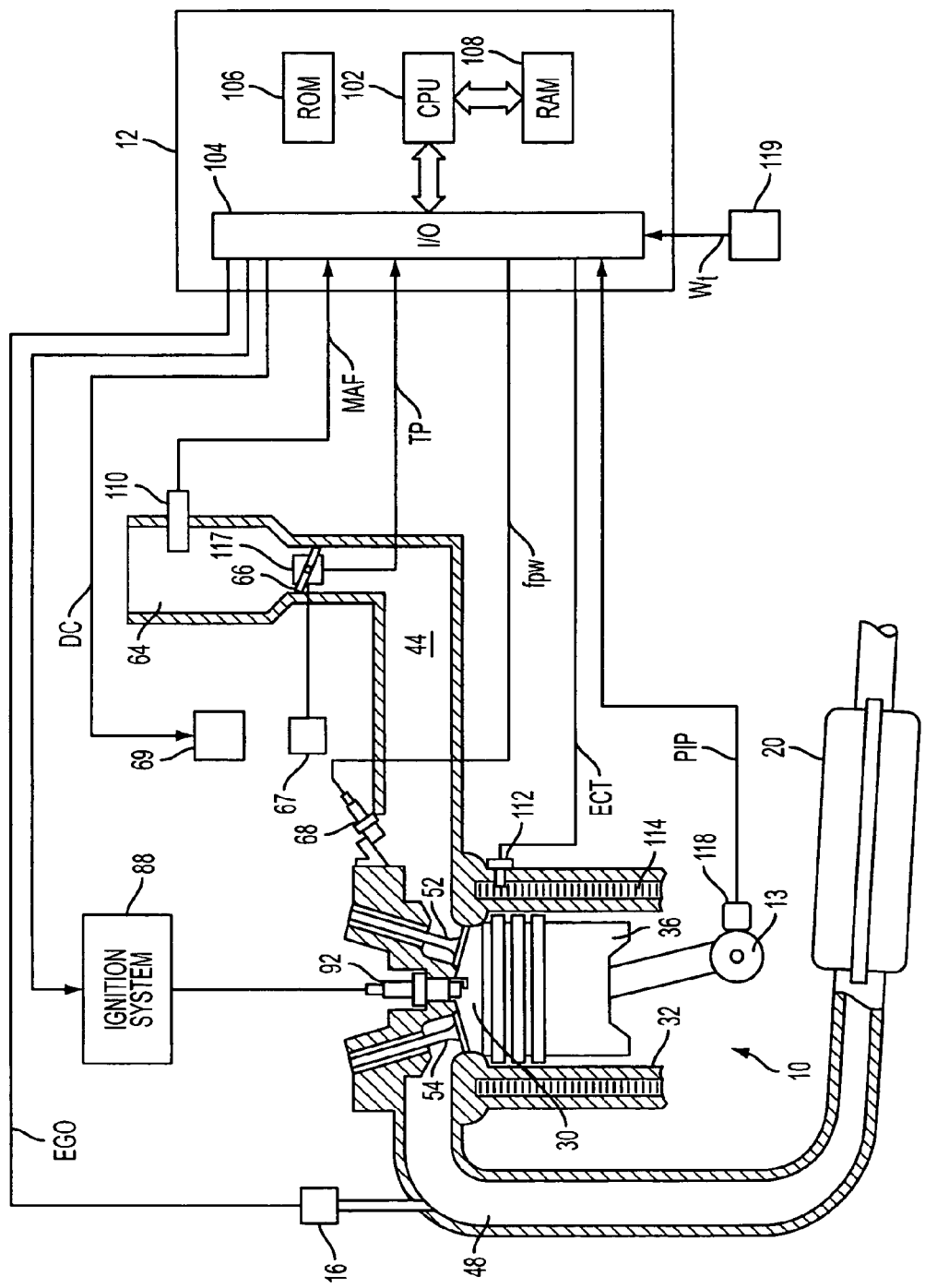
FIG. 1 is a block diagram of an exemplary engine with electric valves.

Referring to FIG. 1, internal combustion engine 10, comprising a plurality of cylinders, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. The intake valve 52 and exhaust valve 54 may be electromechanically actuated by an electric valve actuator depicted in FIG. 2. Alternatively, the engine may have electrically actuated (e.g., camless) intake valves and cam actuated exhaust valves. The cam actuated exhaust valves may have variable cam timing and/or cylinder deactivation. Note that various intake and exhaust valve configurations may be used such as multiple intake valves and multiple exhaust valves per cylinder with combination of electrically actuated or cam actuated valves.

Exhaust gas oxygen sensor 16 is coupled to exhaust manifold 48 of engine 10 upstream of catalytic converter 20. Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Figure 2:
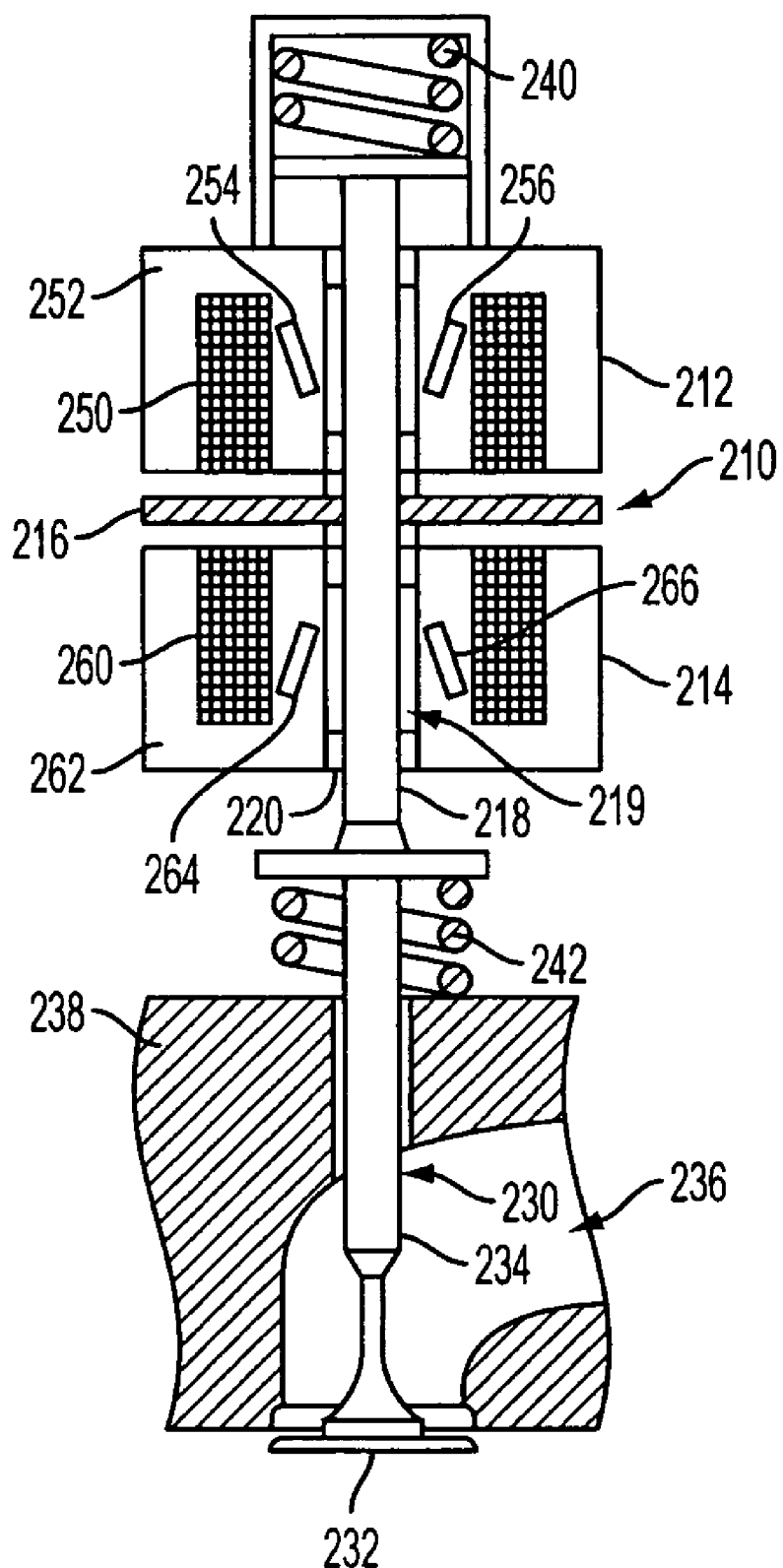
FIG. 2 is a schematic cross-section illustrating one embodiment of an electrical valve actuator assembly for an intake or exhaust valve of an internal combustion engine FIG. 3 provides a graph illustrating different cylinder modes based on speed/torque for an example eight cylinder engine.

Referring now to FIG. 2, a cross-section illustrating a valve actuator assembly for an intake or exhaust valve of an internal combustion engine is shown. Valve actuator assembly 210 includes an upper electromagnet 212 and a lower electromagnet 214. As used throughout this description, the terms "upper" and "lower" refer to positions relative to the combustion chamber or cylinder with "lower" designating components closer to the cylinder and "upper" referring to components axially farther from the corresponding cylinder. An armature 216 is fixed to, and extends outward from, an armature shaft 218, which extends axially through a bore in upper electromagnet 212 and lower electromagnet 214, guided by one or more bushings, represented generally by bushing 220. Armature shaft 218 is operatively associated with an engine valve 230 that includes a valve head 232 and valve stem 234. Armature shaft (armature stem) 218 is located in stem hole 219. Depending upon the particular application and implementation, armature shaft 218 and valve stem 234 may be integrally formed such that armature 216 is fixed to valve stem 234. However, in the embodiment illustrated, shaft 218 and valve stem 234 are discrete, separately moveable components. This provides a small gap between shaft 218 and valve stem 234 when armature 216 is touching upper core 252. Various other connecting or coupling arrangements may be used to translate axial motion of armature 216 between upper and lower electromagnets 212, 214 to valve 230 to open and close valve 230 to selectively couple intake/exhaust passage 236 within an engine cylinder head 238 to a corresponding combustion chamber or cylinder (not shown).

Actuator assembly 210 also includes an upper spring 240 operatively associated with armature shaft 218 for biasing armature 216 toward a neutral position away from upper electromagnet 212, and a lower spring 242 operatively associated with valve stem 234 for biasing armature 216 toward a neutral position away from lower electromagnet 214.

Upper electromagnet 212 includes an associated upper coil 250 wound through two corresponding slots in upper core 252 encompassing armature shaft 218. One or more permanent magnets 254, 256 are positioned substantially between the slots of coil 250.

Lower electromagnet 214 includes an associated lower coil 260 wound through two corresponding slots in lower core 262 encompassing armature shaft 218. One or more permanent magnets 264, 266 are positioned substantially between the slots of lower coil 60.

Figure 3:
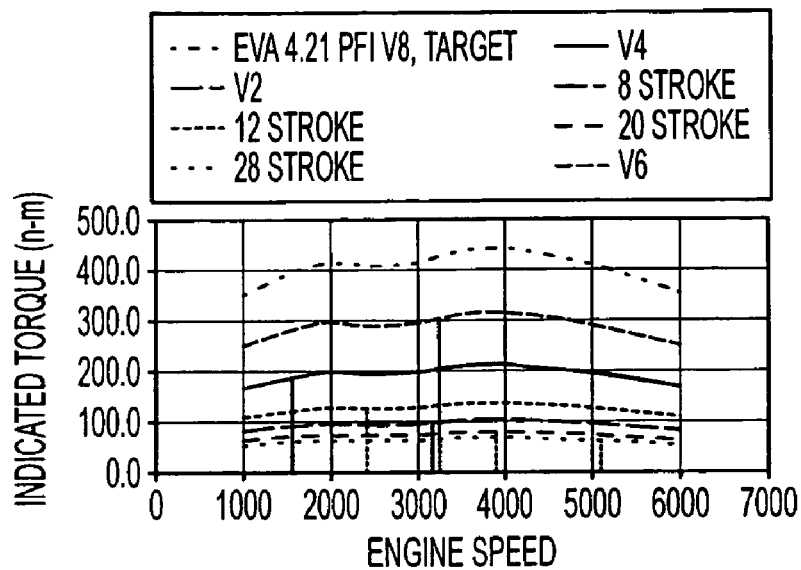

Referring now to FIG. 3, various engine modes are described that may be used. Specifically, as noted above, engine 10 may be an engine with independently adjustable valve timing and/or lift, such as via electrically actuated valves or via continuous variable valve lift systems (electric or hydraulic). In this example, the engine may adjust air charge, spark timing and fuel amount on a cylinder-by-cylinder basis to deliver the desired engine torque. In one example, the engine may be configured so that any given cylinder can operate as either a firing cylinder, i.e. a cylinder that has air, fuel and spark applied to it to produce torque, or as a non-firing cylinder (with valves held closed, or still being actuated in time with the piston). In one example, by controlling the number of firing and non-firing cylinders as a function of engine operating condition it is possible to increase engine fuel economy and minimize the emissions.

One method to improve fuel economy and reduce emissions in an engine with at least one electrically actuated valve is to operate with a reduced number of firing cylinders per unit time allowed for a given operating condition, i.e. engine speed and load. By reducing the number of firing cylinders or the rate at which firing cylinders produce torque, e.g. 8 vs. 4 cylinders, or 12 vs. 4 stroke operation, the engine pumping losses can be reduced which improves the fuel economy and the residuals can be increased within the firing cylinders.

The various operating modes on an example V-8 engine with electrically actuated intake and/or exhaust valves (e.g., 4 vs. 8 cylinder or 12 vs. 4 stroke may be constrained by the maximum torque available at a given mode (e.g. the maximum torque available in 4 cylinder operation), and by a minimum torque available at a given mode. The maximum torque available at given mode versus speed is illustrated by the example mode selection of FIG. 3. Specifically, FIG. 3 shows that different maximum torques may be generated for different engine operating modes, such as different numbers of active cylinders and/or different numbers of strokes of active cylinders.

Minimum torque of a cylinder may be limited by a minimum valve duration. For example, electric valve actuators, such as that described with regard to FIG. 2, may have a minimum transition time (the time required to fully open or close the valve), such as 3.0 to 3.5 ms, and a minimum valve open duration, such as 45 to 50 crank angle degrees per thousand RPM during normal operation. As an example, an EVA engine operating at 6,000 RPM with a minimum valve duration of 50 degrees per thousand RPM will have a minimum intake valve opening to closing duration of 300 degrees. The minimum valve duration may limit the minimum torque that can be generated for a given number of firing cylinders at a given engine speed. There are a number of methods that can be used to lower the minimum torque per firing cylinder, such as the use of early intake valve opening, and late intake valve closure operation, retarding the spark timing and/or reducing the throttle angle and the intake manifold pressure. However, to improve both fuel economy and reduce emissions, it may be more beneficial to reduce the number and/or firing rate of the firing cylinders and thereby reduce the total torque output of the engine, in some cases.

Therefore as the desired engine operating point (e.g., as defined by speed and torque, for example) changes, it may be desirable to change the number and/or firing rate of the firing cylinders. However, when the number or firing rate of the firing cylinders is changed (increased or decreased), transient torque impulses may be generated in the engine output torque, even if cycle average torque (e.g., overall engine cylinders, or a given number of cylinders) may be relatively smooth. Such transient torque variation may excite the driveline vibration. One method that can be used to reduce the excitation of the driveline vibration modes is to either open or modulate the lock-up clutch in the torque converter, if an automatic transmission with a torque converter is used, or to slip one or more of the clutches in the transmission. While modulating the transmission clutch(es) may reduce the effect of the torque transients within the driveline, the energy consumed by slipping the transmission clutch(es) may reduce the fuel economy. Further, to provide improved driveline fuel economy, automatic transmission designs are locking-up the torque converter at lower engine speeds and in lower gears. Thus, the transmission clutch cannot be modulated to reduce the excitation of driveline vibration.

An alternative to (or in addition to) modulating the transmission clutch(es) during a change in the engine operating mode or the number of firing cylinders is to provide improved control of the engine output torque to reduce the transient torque impulses (or generate impulses with a frequency content that avoids vehicle driveline modes).

In other words, average torque in different modes may be provided by generating an average engine torque before and after the transition that is relatively equal, i.e., average torque during the transition is relatively smooth. In other words, the torque may be gradually increasing or decreasing to provide desired driver demanded torque; however, immediately before and after the transition total average engine torque is substantially smooth. For example, during an eight to four cylinder transition, the charge per cylinder would be increased by roughly a factor of two and the fuel and spark would be adjusted accordingly to produce the same output torque in four cylinder operation as in eight cylinder operation. However, if this technique is used directly, as noted above, transient torque impulses may still be generated that may excite the driveline vibration modes, as described in more detail herein.

In an engine that is constrained to apply the same valve timing and lift to all of the firing cylinders, such as in some variable displacement engines, the throttle may be used to adjust the cylinder charge. Due to the lag associated with the manifold filling dynamics, throttle adjustments may be supplemented via other adjustments, such as spark timing adjustments. For example, spark timing and/or fuel pulse width adjustments may be used to reduce torque transients during a mode transition. If the spark timing is used and an increase in the torque on the first one or more cylinders after the mode transition is desired, then spark retard would be scheduled prior to the mode transition to allow the desired torque increase. However, such an approach may decrease fuel economy (due to the use of significant spark retard). Similarly, varying the fuel pulse width on one or more cylinders would require an adjustment of the fuel pulse width on the remaining cylinders to avoid a deviation (rich excursion) from a desired overall air-fuel ratio, such as stoichiometry.

Note that if electrically actuated intake/exhaust valves are present, air charge in the firing cylinders can be controlled on a cylinder-by-cylinder basis by varying the intake and/or exhaust valve timing or lift. Further, the torque output per cylinder can be controlled by adjusting the valve timing, fuel and spark simultaneously. This ability to adjust the torque on a cylinder-by-cylinder basis can then be used to reduce the engine output torque transient during a mode transition, while reducing fuel economy penalties and emissions.

As will be described in more detail below, various example approaches may be used for compensating for transient torque impulses that would otherwise be generated during a change in the number and/or firing rate of firing cylinders. In one approach, a method is provided for reducing engine output torque transients during a mode transition that accounts for a maximum and minimum torque per cylinder as a function of engine mode (e.g., number of firing cylinders) and operating point (e.g., engine speed, temperature, and/or load/torque). The maximum and minimum torque per cylinder may be used to determine whether or not the cylinder torque should be increased or decreased on the first one or more firing cylinders before or after a mode transition to cancel the engine output torque transient. If the maximum engine output torque potential is being decreased during a mode transition, e.g. transitioning from 8 to 4 cylinders in a V-8 engine, then the maximum torque per cylinder may prevent the initial firing cylinder(s) from generating a sufficient torque increase to cancel the engine output torque transient. In this case, the output torque transient can be reduced by scheduling the first cylinder(s) in the lower maximum torque mode to be a firing cylinder and by adjusting the torque output of the first one or more firing cylinders to be less than the torque required to match the average torque in the higher maximum torque output potential mode.

On the other hand, if the maximum engine torque output potential is being increased during a mode transition, e.g. transitioning from 4 to 8 cylinders, then the minimum torque per cylinder may prevent the initial firing cylinder(s) from generating a sufficient torque reduction to cancel the engine output torque transient. In this case the output torque transient can be minimized by scheduling the final cylinder in the lower maximum torque output potential mode to be a non-firing, or reduced torque output cylinder and by adjusting the torque output of the first one or more firing cylinders, in the higher maximum torque output potential mode, to be greater than the torque required to match the average torque in the lower maximum torque output potential mode.

Figure 4:
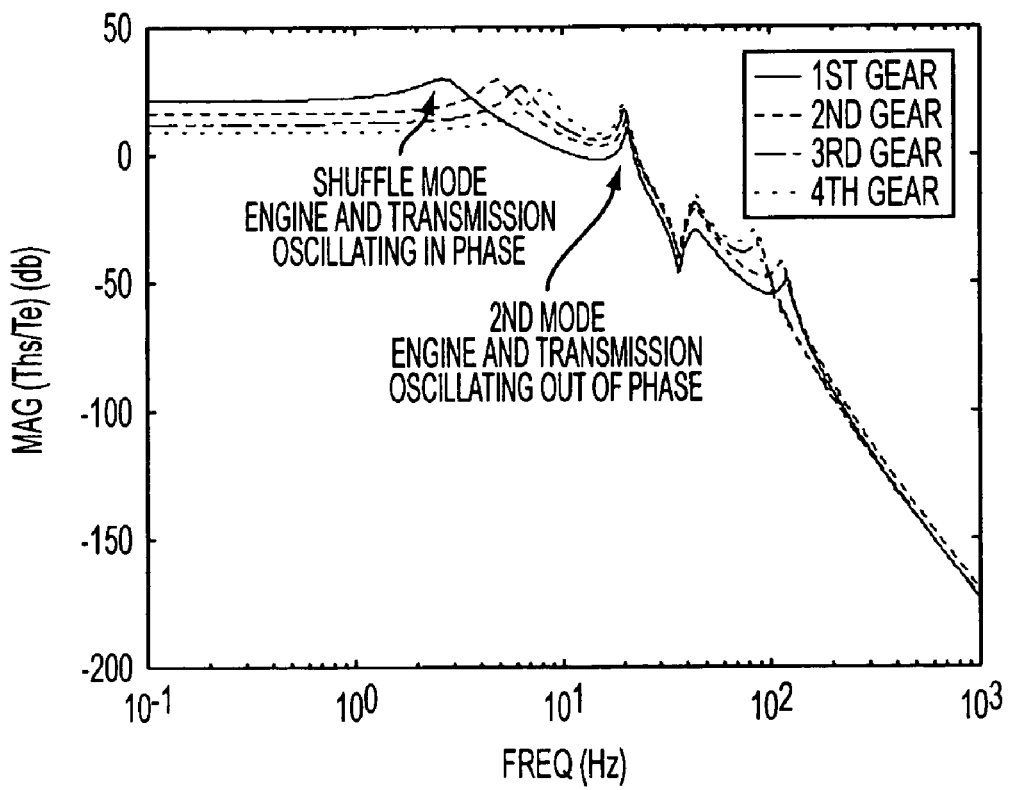
FIG. 4 shows a graph illustrating driveline vibration modes of an example vehicle.

Referring now to FIG. 4, a graph illustrates example driveline vibration modes. Specifically, the half shaft torque frequency response of a vehicle driveline with an automatic transmission is shown as a function of engine firing frequency (which can be a function of the number of firing cylinders and engine speed). In FIG. 4, the driveline vibration modes can be identified by the various peaks. These modes include:

a shuffle mode, the in phase oscillation of the engine and transmission inertias on the half shaft compliance, a second mode, the out of phase oscillation of the engine and transmission inertias on the damper compliance; and higher frequency modes associated with the wheel inertia on the tire rotational compliance and the transmission input shaft compliance.

Because the sensitivity of the human body to longitudinal vibration is high in the 2 to 8 Hz range, drivers may experience degraded drive feel if the lowest frequency driveline vibration mode, the shuffle mode, is excited. Therefore, as described herein, torque adjustments to one of the last cylinder in the mode being exited and the first cylinder in the new mode are adjusted in a way that reduces the excitation of the shuffle mode during transitions.

Figure 5:
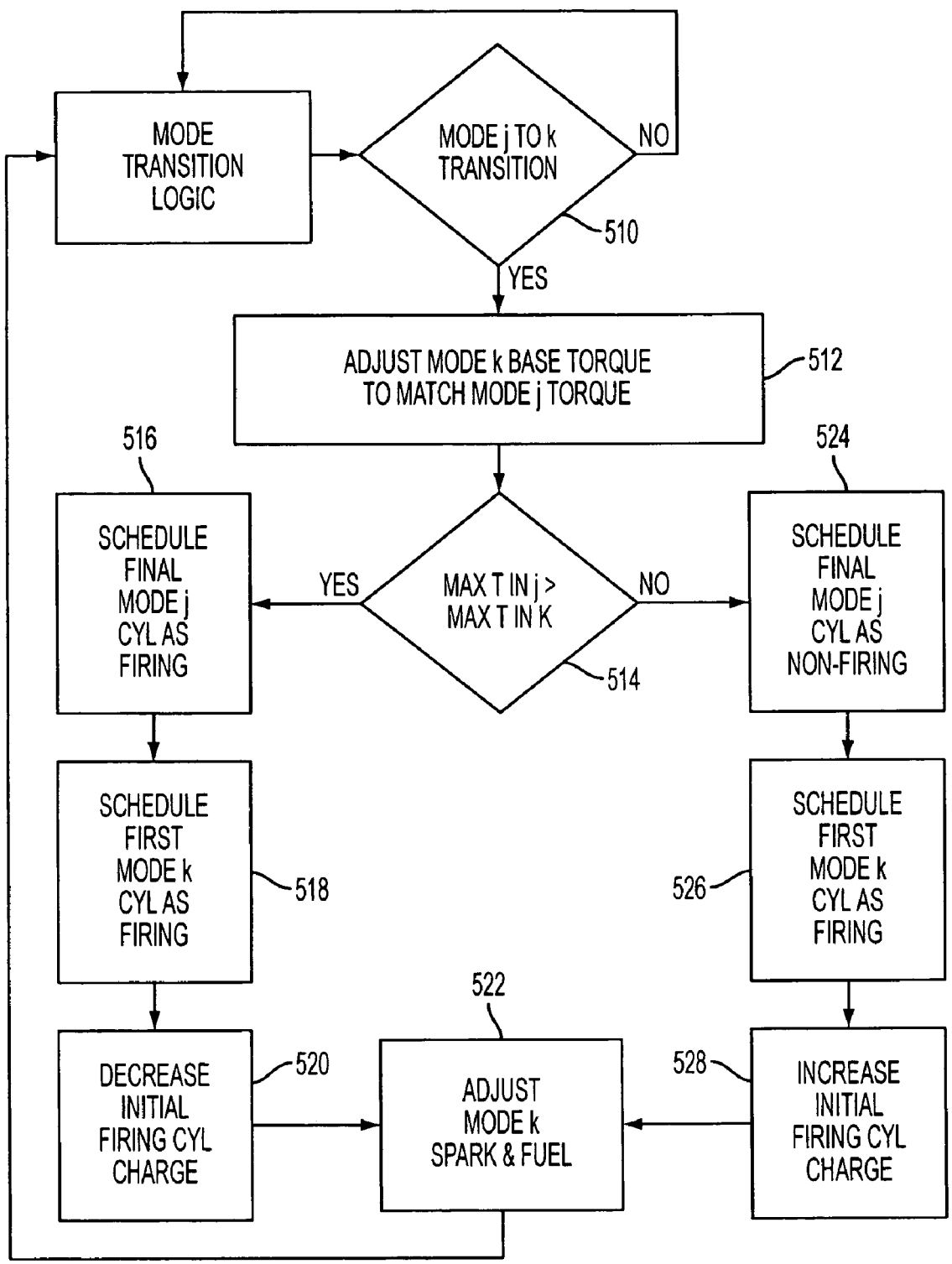
FIG. 5 is a high level flow diagram of a mode transition routine.

Referring now to FIG. 5, a high level flow diagram illustrates an example embodiment routine or method 500 for controlling engine operation during changes in a number of firing cylinders. In general terms, a method is described for controlling the output torque of an engine with electrically actuated valves (e.g., one electrically actuated valve per cylinder, or all valves being electrically actuated, etc.). The method may adjust torque on a cylinder-by-cylinder basis to reduce the excitation of a driveline shuffle mode and the longitudinal acceleration during a change in engine operating mode from mode j to mode k, where the modes have a different number of firing cylinders, or a different torque output potential, for example. First, the routine determines, at 510 whether a mode transition from a first mode (j) with a first number of firing cylinders to a second mode (k) with a second number of firing cylinders is present.

If so, the routine, at 512, matches the base steady state engine output torque of mode k to the steady state output torque of mode j by adjusting the base air charge, fuel and spark timing of mode k. Then, the routine determines, at 514 whether the number of firing cylinders or the maximum torque output potential is increasing or decreasing as the engine mode transitions from mode j to k by, for example, determining whether the maximum torque output potential in mode j is greater than the maximum torque output potential in mode k. If the number of firing cylinders or the maximum torque output potential is greater in mode j than mode k then the routine proceeds to 516, 518, 520, and 522. At 516, the routine operates the final cylinder in mode j to be a firing cylinder. At 518, the routine operates the first cylinder in mode k to be a firing cylinder. Then at 520, the routine d reduces the torque output of the first one or more cylinders in mode k to cancel or reduce the shuffle mode excitation using various adjustments. These adjustments may include one or more air charge reductions (via valve timing, valve lift, throttle adjustments, or combinations thereof), spark retard, and/or fuel pulse width adjustment. For example, at 520 the initial charge may be temporarily reduced in the first mode k cylinder by valve timing and/or lift adjustments.

On the other hand, if the number of firing cylinders or the maximum torque output potential is greater in mode k than mode j then the routine proceeds to 524, 526, 528, and 522. At 524, the routine operates the final cylinder in mode j to be a non-firing, or reduced torque output, cylinder. At 526, the routine operates the first cylinder in mode k to be a firing cylinder. Then at 528, the routine increases the torque output of the first one or more cylinders in mode k to cancel the shuffle mode excitation. Again, these adjustments may include one or more of: air charge increase, spark advance, and/or fuel pulse width adjustments. For example, in 528 the initial charge may be temporarily increased in the first mode k cylinder by valve timing and/or lift adjustments. In one particular embodiment, the amount of increase/reduction of 520 and/or 528 can be adjusted via a cylinder pressure torque multiplier, $K_{trans}$.

In this way, it is possible to provide improved transitions between different numbers of firing cylinders both over a shorter and longer time scale.

Note that there are various ways to operate active and inactive cylinders. For example, inactive cylinders may operate with a corresponding fuel injector or spark plug deactivated for one or more cycles, or may have one or more electrically actuated valves held closed or left in a neutral position for one or more cycles, or combinations thereof.

Figure 6:
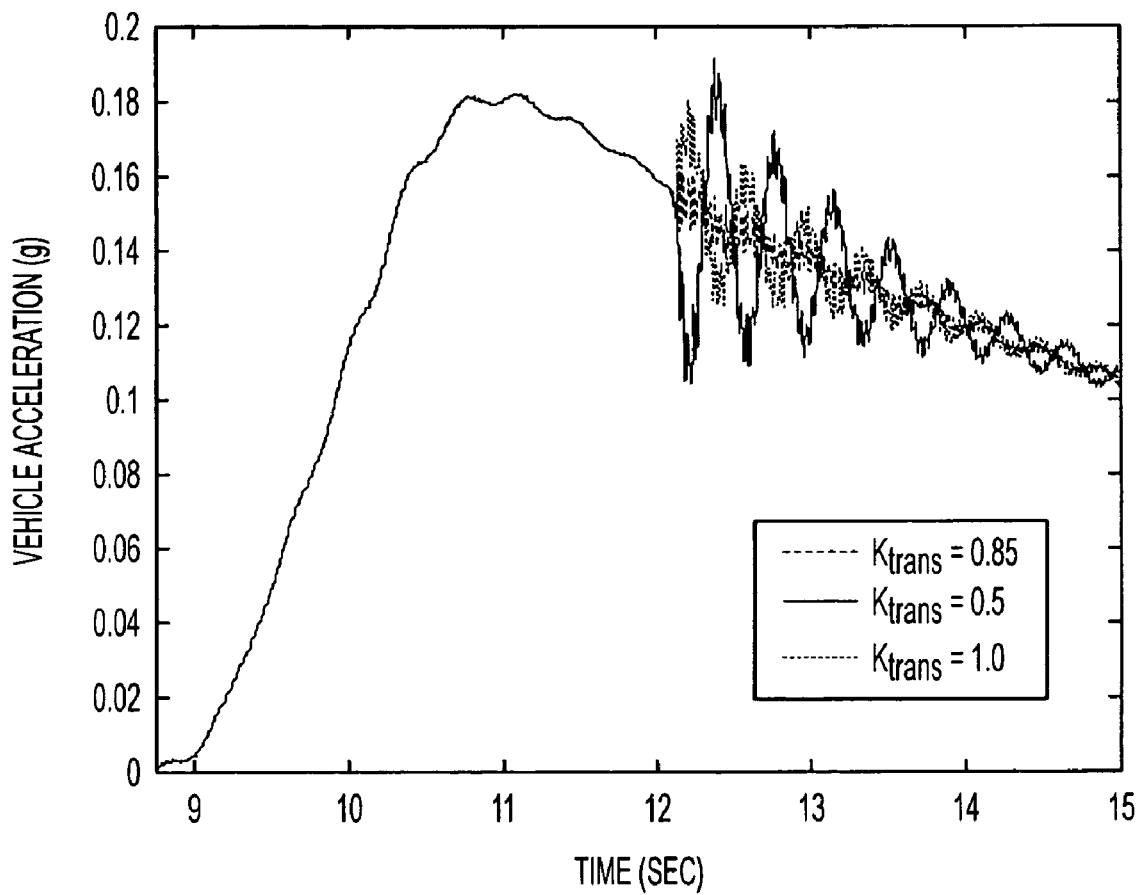
FIG. 6 shows an example driver tip-in vehicle acceleration response in second gear with a torque converter lock-up clutch engaged, along with an eight to four cylinder mode transition.
Figure 7:
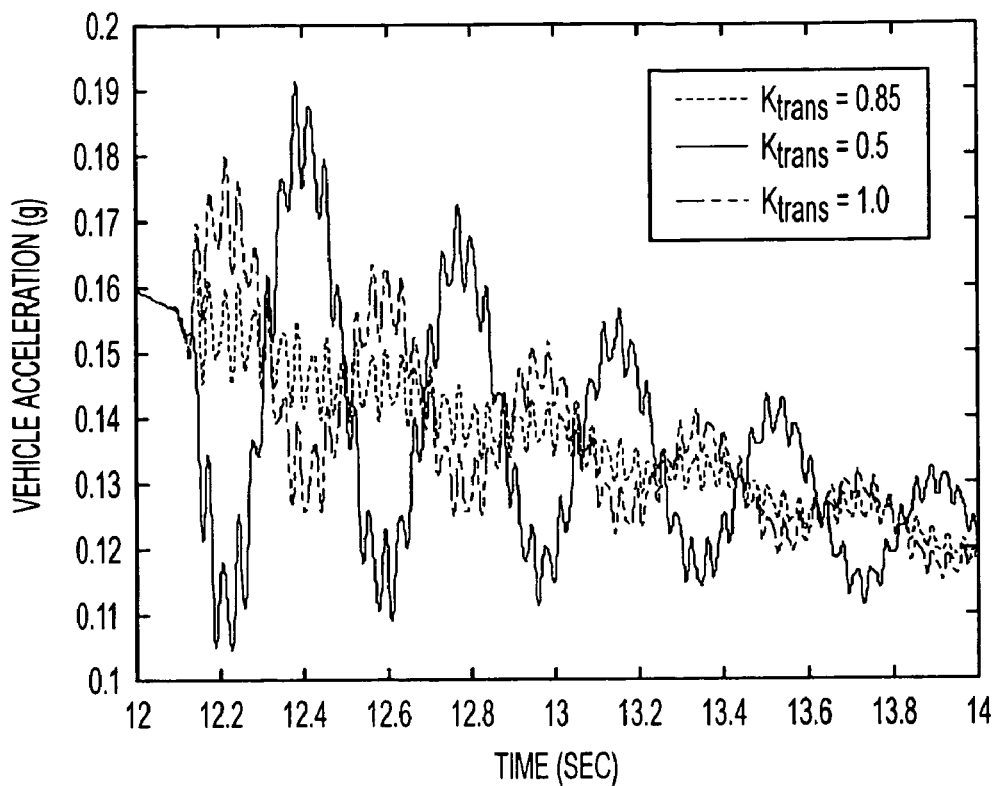
FIG. 7 shows an enlarged view of the tip-in response of FIG. 6.

Referring now to FIGS. 6-10, the method 500 described herein was simulated for an example condition of changing from eight to four and four to eight cylinder operation during a tip-in with a torque converter lock-up clutch engaged. FIGS. 6-10 are prophetic examples of the example conditions. Specifically, FIGS. 6 and 7 show the vehicle acceleration response, during a mode transition from eight to four cylinders in second gear with the torque converter lock-up clutch engaged, along with cylinder pressure torque multipliers, $K_{trans}$, of 1.0, 0.5 and 0.85. In this example, the value of $K_{trans}$, is used to adjust the output torque of the first firing cylinder after the mode transition. In addition, the first 4-cylinder mode cylinder was scheduled as a firing cylinder to allow the use of torque reduction to cancel the shuffle mode excitation. As shown in FIG. 7, setting $K_{trans}$, to 1.0, which is equivalent to matching the steady state torque on all firing cylinders before and after the mode transition, generates a peak-to-peak longitudinal vehicle acceleration of more than 0.05 g's. Further, by reducing $K_{trans}$, to 0.5, the peak-to-peak acceleration increases to 0.09 g's. However, by setting $K_{trans}$, to 0.85, the peak-to-peak acceleration reduces to 0.015 g's, which is below human perception level of 0.02 g's.

Figure 8:
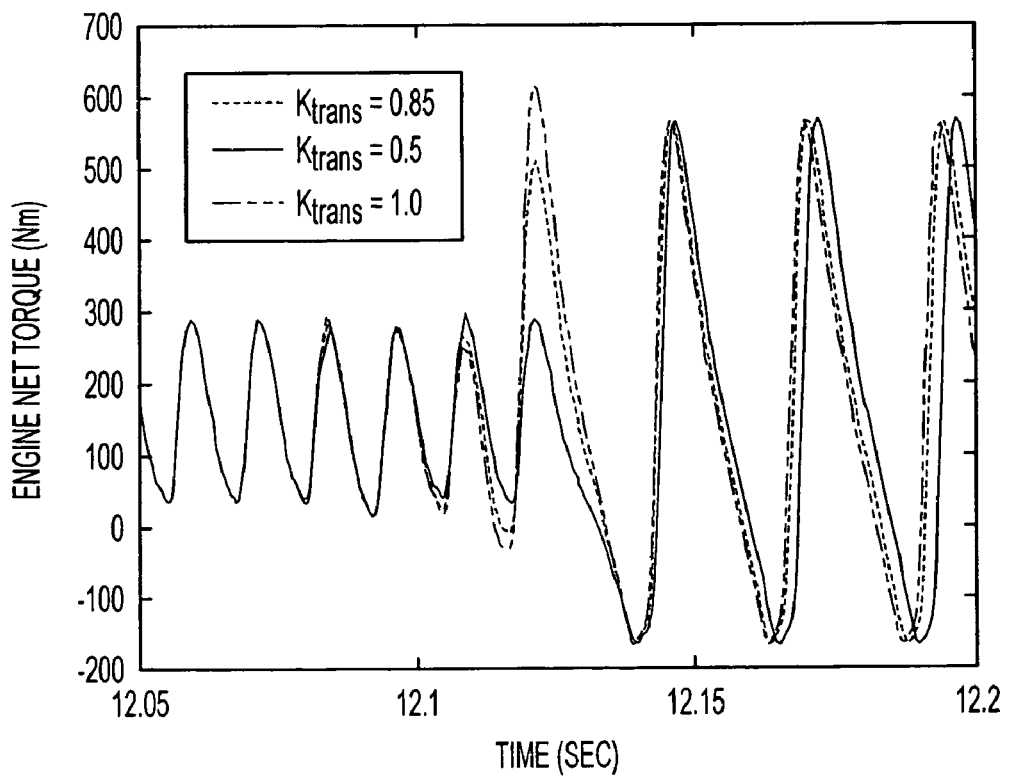
FIG. 8 shows an eight to four cylinder mode transition net engine torque response.

The engine gas pressure torque, net torque, for the 8-cylinder to 4-cylinder mode transition response with $K_{trans}$=1.0, 0.5 and 0.85 is shown in FIG. 8. As shown in FIG. 8 the reduction in the vehicle acceleration, shown in FIG. 7, is achieved by reducing the torque output of the first firing cylinder after the mode transition from 8 to 4 cylinders. The net torque, which is shown in FIG. 8, is calculated from a weighted sum of the cylinder pressures from the firing and non-firing cylinders. As shown by FIG. 8, with $K_{trans}$=0.85, both the overall average torque, and the average torque over short timescales about the transition are relatively smooth and constant according to operation of the methods described herein. In other words, when maintaining average torque over time or multiple cycles substantially constant, yet adjusting individual cylinder torques several cycles before, during, or after the transition, average torque may be gradually increasing or decreasing, for example.

Figure 9:
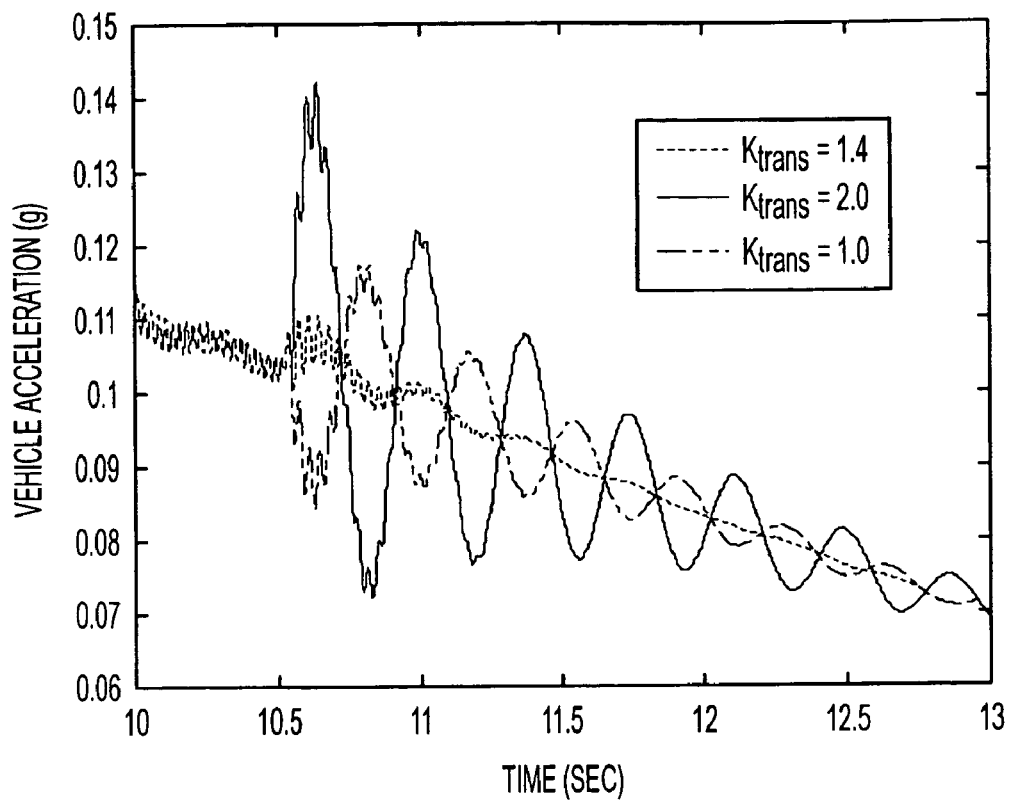
FIG. 9 shows a four to eight cylinder mode transition vehicle acceleration response in second Gear with a torque converter lock-up clutch engaged.
Figure 10:
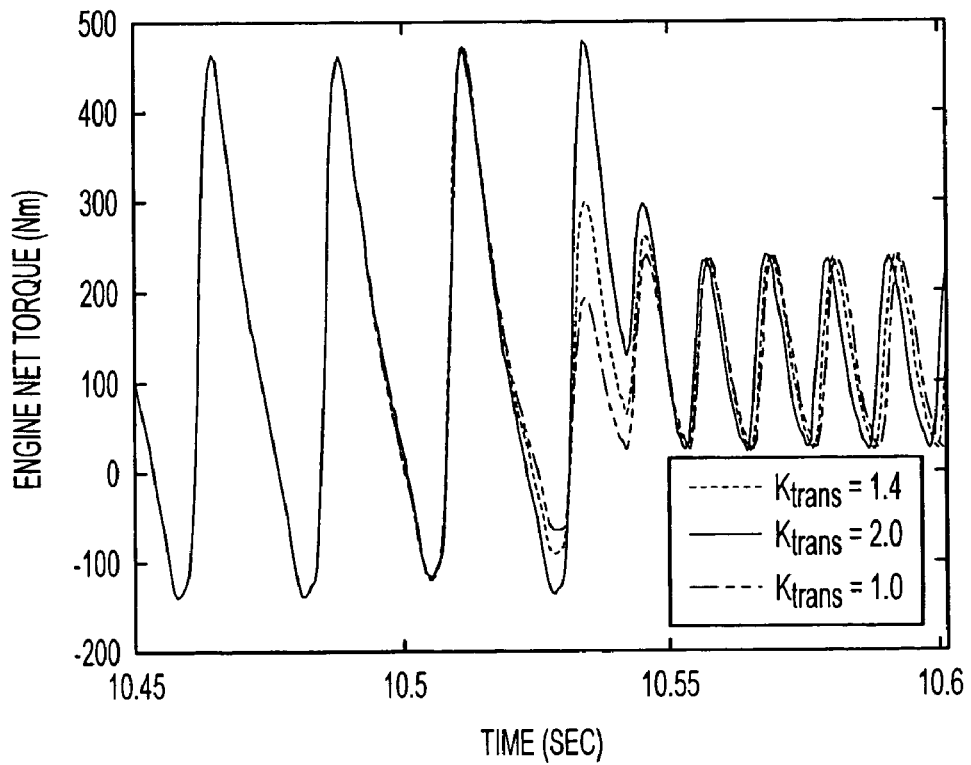
FIG. 10 shows a four to eight cylinder mode transition net engine torque response.

In FIGS. 9 and 10, the vehicle acceleration and net torque responses are shown for a four to eight cylinder mode transition in second gear with the torque converter lock-up clutch engaged. In this case the number of firing cylinders is increasing from four to eight during the mode transition. Therefore, according to the method 500, the final cylinder in the four cylinder mode in scheduled as a non-firing cylinder and the torque output of the first firing cylinder in the eight cylinder mode is increased to reduce the excitation of the shuffle mode.

As shown in FIG. 9, setting $K_{trans}$ to 1.0, which is equivalent to matching the steady state torque on all firing cylinders before and after the mode transition, generates a peak-to-peak longitudinal vehicle acceleration of more than 0.035 g's. Further, by increasing $K_{trans}$ to 2.0, the peak-to-peak acceleration increases to 0.07 g's. However, by setting $K_{trans}$ to 1.4, the peak-to-peak acceleration reduces to 0.014 g's, which is below human perception level of 0.02 g's.

The engine gas pressure torque, net torque, for the 4-cylinder to 8-cylinder mode transition response with $K_{trans}$=1.0, 1.4 and 2.0 is shown in FIG. 10. As shown in FIG. 10 the reduction in the vehicle acceleration, shown in FIG. 9, is achieved by increasing the torque output of the first firing cylinder after the mode transition from 4 to 8 cylinders. As shown by FIG. 10, with $K_{trans}$=1.4, both the overall average torque, and the average torque over short timescales about the transition are relatively smooth and constant according to operation of the methods described herein. Again, like the examples described above, when maintaining average torque over time or multiple cycles substantially constant, yet adjusting individual cylinder torques several cycles before, during, or after the transition, average torque may be gradually increasing or decreasing, for example.

As shown herein, various embodiments are shown, some of which address mode changes when the maximum engine output potential or the number of the firing cylinders is being increased during a mode transition, e.g. transitioning from four cylinders to eight cylinders. The output torque transient can be reduced by scheduling the last cylinder in the lower maximum output torque to be a non-firing cylinder or reduced torque cylinder and by increasing the output torque of a preselected cylinders in the higher maximum torque mode (more firing cylinder with lower output torque per engine) to match the average torque in the lower maximum torque output mode (less firing cylinder with higher output torque per engine).

In another embodiment, a routine is described for changing operating modes from a first mode having the first number of firing cylinders to a mode having the second number of firing cylinders, where the first number of firing cylinder may be different from the second number of firing cylinder. In one example, the routine controls the output torque during a transition from the first mode to the second mode by adjusting the output torque of the last cylinder in the first mode and adjust the output torque of the preselected cylinders in the second mode according to the number of firing cylinder in the first mode and the second mode, thereby reducing a shuffle mode excitation and longitudinal acceleration.

According to such operation, it is possible to reduce the driveline vibration when the maximum engine output potential or the number of the firing cylinders is either being increased or being decreased during a mode transition. In one particular aspect, accurate control may be achieved by adjusting the output torque of individual cylinders through valve timing, fuel and/or spark, singly or simultaneously. In this way, desired control can be achieved while improving fuel economy.

It should be noted that the torque converter may be maintained locked as in the simulated example conditions described above. However, under other transitions (such as when the gear ratio is changing or under higher engine speeds) the torque converter may be unlocked. For example, during a specific speed or load range where vibration may be more noticeable, the torque converter may be partially unlocked or open during a cylinder mode transition. Alternatively, the torque transient reduction method such as method 500 may be performed during the mode transition while the torque converter is maintained at least partially unlocked or open to further reduce the shuffle mode excitation.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various camshaft and/or valve timings, fuel injection timings, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine having multiple cylinders, each with at least one electrically actuated valve, the engine operating in a first mode having a first number of firing cylinders and a second mode having a second number of firing cylinders greater than said first mode, the method comprising:

when transitioning the engine from operating in the first mode to the second mode and maintaining average torque substantially constant;

operating a last cylinder in said first mode to provide a reduced torque output relative to the average torque output;

operating a first cylinder in said second mode to be a firing cylinder with an increased torque relative to the average torque output; and when transitioning the engine from operating in the second mode to the first mode and maintaining average torque substantially constant;

operating a last cylinder in said second mode to be a firing cylinder;

operating a first cylinder in said first mode to be a firing cylinder, where a torque output of said first cylinder in said first mode is reduced relative to the average torque output.

2. The method of claim 1 wherein said torque is adjusted by varying a timing or lift of an electrically actuated cylinder valve to reduce a shuffle mode excitation and longitudinal acceleration of the vehicle.

3. The method of claim 1 wherein when transitioning the engine from operating in the first mode to the second mode and maintaining average torque substantially constant; operating the last cylinder in said first mode to be a non-firing cylinder.

4. The method of claim 1 wherein said transitioning is performed with a locked torque converter under one set of operating conditions, and performed with an unlocked torque converter under another set of operating conditions.

5. The method of claim 1 wherein said average torque is controlled by adjusting a valve timing or lift of an electrically actuated cylinder valve.

6. The method of claim 1 wherein said average torque is controlled by adjusting one or more of spark timing, fuel, and throttle position.

7. A method for controlling an engine having multiple cylinders, each with at least one electrically actuated valve, the engine operating in a first mode having a first number of firing cylinders and a second mode having a second number of firing cylinders greater than said first mode, the method comprising:

when transitioning the engine from operating in the first mode to the second mode and maintaining average torque substantially constant;
operating a last cylinder in said first mode to be a non-firing cylinder;
operating a first cylinder in said second mode to be a firing cylinder with an increased torque relative to the average torque output by adjusting valve operation of an electrically actuated valve of the first cylinder in said second mode; and when transitioning the engine from operating in the second mode to the first mode and maintaining average torque substantially constant;
operating a last cylinder in said second mode to be a firing cylinder;
operating a first cylinder in said first mode to be a firing cylinder, where a torque output of said first cylinder in said first mode is reduced relative to the average torque output by adjusting valve operation of an electrically actuated valve of the first cylinder in said first mode.

8. The method of claim 7 wherein said transitioning is performed with a locked torque converter under one set of operating conditions, and performed with an unlocked torque converter under another set of operating conditions.

9. A system for a vehicle, comprising:
an engine having multiple cylinders, each with at least one electrically actuated valve, the engine operating in a first mode having a first number of firing cylinders and a second mode having a second number of firing cylinders greater than said first mode;
a torque converter coupled to the engine;
a transmission coupled to the torque converter; and
a controller for controlling engine operation, where when transitioning the engine from operating in the first mode to the second mode and maintaining average torque substantially constant, the controller operates a last cylinder in said first mode to be a non-firing cylinder and operates a first cylinder in said second mode to be a firing cylinder with an increased torque relative to the average torque output by adjusting valve operation of an electrically actuated valve of the first cylinder in said second mode; and when transitioning the engine from operating in the second mode to the first mode and maintaining average torque substantially constant, the controller operates a last cylinder in said second mode to be a firing cylinder, and operates a first cylinder in said first mode to be a firing cylinder, where a torque output of said first cylinder in said first mode is reduced relative to the average torque output by adjusting valve operation of an electrically actuated valve of the first cylinder in said first mode, the controller further adjusting torque transmission of the torque converter during transitions.

* * * * *